(12) United States Patent
Pondelick et al.

(10) Patent No.: US 6,385,789 B1
(45) Date of Patent: May 14, 2002

(54) VACUUM GALLERY WASTE DISPOSAL SYSTEM

(75) Inventors: Mark A. Pondelick, Roscoe; Mitchell D. Gilbert, South Beloit; LaVern R. McCallips, Roscoe, all of IL (US)

(73) Assignee: Evac International Oy, Helsinki (FI)

( * ) Notice: Subject to any disclaimer, the term of this patent is extended or adjusted under 35 U.S.C. 154(b) by 0 days.

(21) Appl. No.: 09/639,691

(22) Filed: Aug. 16, 2000

(51) Int. Cl.$^7$ ............................................... E03D 11/10
(52) U.S. Cl. .................................. 4/427; 4/431; 4/668
(58) Field of Search ........................... 4/313, 321, 427, 4/431, 434, 653, 668, DIG. 3

(56) References Cited

U.S. PATENT DOCUMENTS

| | | | |
|---|---|---|---|
| 4,275,470 A | * 6/1981 | Badger et al. | 4/431 X |
| 5,495,626 A | * 3/1996 | Lindroos et al. | 4/431 X |
| 5,732,417 A | * 3/1998 | Pondelick et al. | 4/427 |
| 6,223,361 B1 | 5/2001 | Rozenblatt | 4/653 |

* cited by examiner

Primary Examiner—Robert M. Fetsuga
(74) Attorney, Agent, or Firm—Marshall, Gerstein & Borun

(57) ABSTRACT

A galley waste disposal system is provided for use with an existing vacuum collection system. The galley waste disposal system includes a basin for receiving galley waste and a discharge valve connected between the basin and a collection tank. The discharge valve is vacuum-operated and has an actuating port. An electrically-operated vacuum control valve is connected between the actuating port and a vacuum source. A flush element is also provided that is actuatable to produce a discharge command. A controller is operably connected to the control valve and is selectively operable in response to the discharge command to place the actuating port in fluid communication with the vacuum source, thereby to open the discharge valve. In addition, the discharge valve, vacuum control valve, and controller may be housed in an enclosure suitable for mounting remotely from the basin.

26 Claims, 4 Drawing Sheets

VACUUM GALLERY WASTE DISPOSAL SYSTEM

FIELD OF THE INVENTION

The present invention generally relates to vacuum collection systems and, more particularly, to galley waste disposal systems for use on vehicles.

BACKGROUND OF THE INVENTION

Vacuum collection systems are generally known in the art for use on vehicles such as aircraft. Vacuum collection systems typically include a vacuum source connected to a tank for collecting waste. The tank is connected to a waste receiving apparatus, such as a toilet bowl, and a discharge valve is provided between the waste receiving apparatus and the tank. In operation, the discharge valve is temporarily opened to establish fluid communication between the tank and the receiving apparatus, so that the resulting pressure differential across the toilet forces waste material into the tank.

More recently, galley waste systems have been provided which tap into the existing vacuum collection systems. For example, a galley waste collection system is described in U.S. Pat. No. 6,006,373 to Hoang. In Hoang, the galley waste system includes a basin connected by a discharge valve to a vacuum collection tank. A spray ring is positioned in the basin and is connected by a rinse water valve to a water supply. Both the discharge valve and rinse water valve are vacuum operated. A pneumatic flush control unit is attached to the discharge valve and rinse water valve to actuate the valves in response to a flush command. In operation, the flush control unit transfers vacuum to the desired valve, thereby opening the valve. When the vacuum pressure is removed, the valve returns to a normally closed position.

While the galley waste system of Hoang provides a useful solution to the problem of galley waste collection, it suffers from certain drawbacks. Most significantly, when a relatively weak vacuum level is present in the vacuum collection system, the pneumatic flush control unit does not always function properly. The vacuum level is often low when the aircraft is on the ground and must rely on the vacuum source, typically a vacuum blower, to generate vacuum in the system. As a result, the discharge and rinse water valves are often rendered inoperable. In addition, because vacuum operated valves are used, it is overly difficult and expensive to determine the positions of the valve, which is useful for feedback systems.

U.S. Pat. No. 6,012,678 to Hale et al. also discloses a galley vacuum waste disposal system for use with an existing sewage waste system. The Hale et al. galley vacuum waste system includes a basin connected by a flush valve to a waste storage tank. The flush valve is described as a motorized valve such as a solenoid or electrical motor operated valve. This system also includes an electrically operated rinse valve for providing rinse water to the basin. While it is easier to provide valve position feedback, the electrically operated flush and rinse valves require a considerable amount of current (on the order of 2.5 amps) to actuate between open and closed positions. Such power requirements are particularly detrimental in an aircraft environment, where available current is limited.

Furthermore, in both the Hoang and Hale et al. devices, the discharge valve, rinse water valve, and other components are positioned in a cabinet directly below the basin. As a result, these previous systems require an overly large amount of space that could otherwise be used for other purposes, such as, for example, to store food service trolleys.

In view of the foregoing, there is a need for a galley waste disposal system that reliably operates regardless of vacuum level and has minimal power requirements. In addition, there is a need for a galley waste disposal system that maximizes the amount of usable space under the basin.

SUMMARY OF THE INVENTION

In accordance with certain aspects of the present invention, galley waste apparatus is provided for use with an existing vacuum collection system having a tank and a vacuum source. The galley waste apparatus comprises a basin for receiving galley waste, the basin having an outlet, a discharge valve connected between the basin outlet and the tank, the discharge valve having an actuating port responsive to vacuum for opening the discharge valve, an electrically-operated vacuum control valve connected between the actuating port and the vacuum source, and a flush element actuatable to produce a discharge command. A controller is operably connected to the control valve and selectively operable in response to the discharge command to place the actuating port in fluid communication with the vacuum source, thereby to open the discharge valve.

In accordance with additional aspects of the present invention, galley waste apparatus is provided for use with an existing vacuum collection system having a tank and a vacuum source. The galley waste apparatus comprises a basin for receiving galley waste, the basin having an outlet, a discharge valve connected between the basin outlet and the tank, a rinse valve connected between the basin and a rinse fluid source, the rinse valve having an actuating port responsive to vacuum for opening the rinse valve, an electrically-operated vacuum control valve connected between the rinse valve actuating port and the vacuum source, and a flush element actuatable to produce a discharge command. A controller is operably connected to the discharge valve and the control valve, the controller selectively operably in response to the discharge command to place the actuating port in fluid communication with the vacuum source, thereby to open the rinse valve.

In accordance with further aspects of the present invention, a galley waste disposal system is provided for use with an existing vacuum collection system having a tank and a vacuum source. The galley waste disposal system comprises a basin for receiving galley waste, the basin having an outlet, a nozzle associated with the basin for dispensing rinse water, and a flush element actuatable to produce a discharge command. An enclosure is remotely positioned from the basin, the enclosure housing a discharge valve connected between basin outlet and the tank, a rinse valve connected between the nozzle and a rinse water source, and a controller operably coupled to the discharge valve and rinse valve, the controller selectively operably in response to the discharge command to actuate the discharge valve and rinse valve.

In accordance with still further aspects of the present invention, a galley waste disposal system is provided for use with an existing vacuum collection system having a tank and a vacuum source. The galley waste disposal system comprises a basin for receiving galley waste, the basin having an outlet and a lid movable between a closed position, in which the lid covers a top of the basin, and an open position, in which the lid is spaced from the top of the basin. A nozzle is associated with the basin for dispensing rinse water, and a lid detector is provided for determining the position of the lid and generating a lid open signal and a lid closed signal.

The apparatus includes a flush element actuatable to produce a discharge command, a discharge valve connected between basin outlet and the tank, and a rinse valve connected between the nozzle and a rinse water source. A controller is operably coupled to the discharge valve and rinse valve, the controller selectively operably in response to the discharge command to actuate the discharge valve and rinse valve, wherein the controller operates only the discharge valve when a lid open signal is received, and wherein the controller operates both the discharge and rinse valves when a lid closed signal is received.

DETAILED DESCRIPTION OF THE PREFERRED EMBODIMENTS

Figure 1:
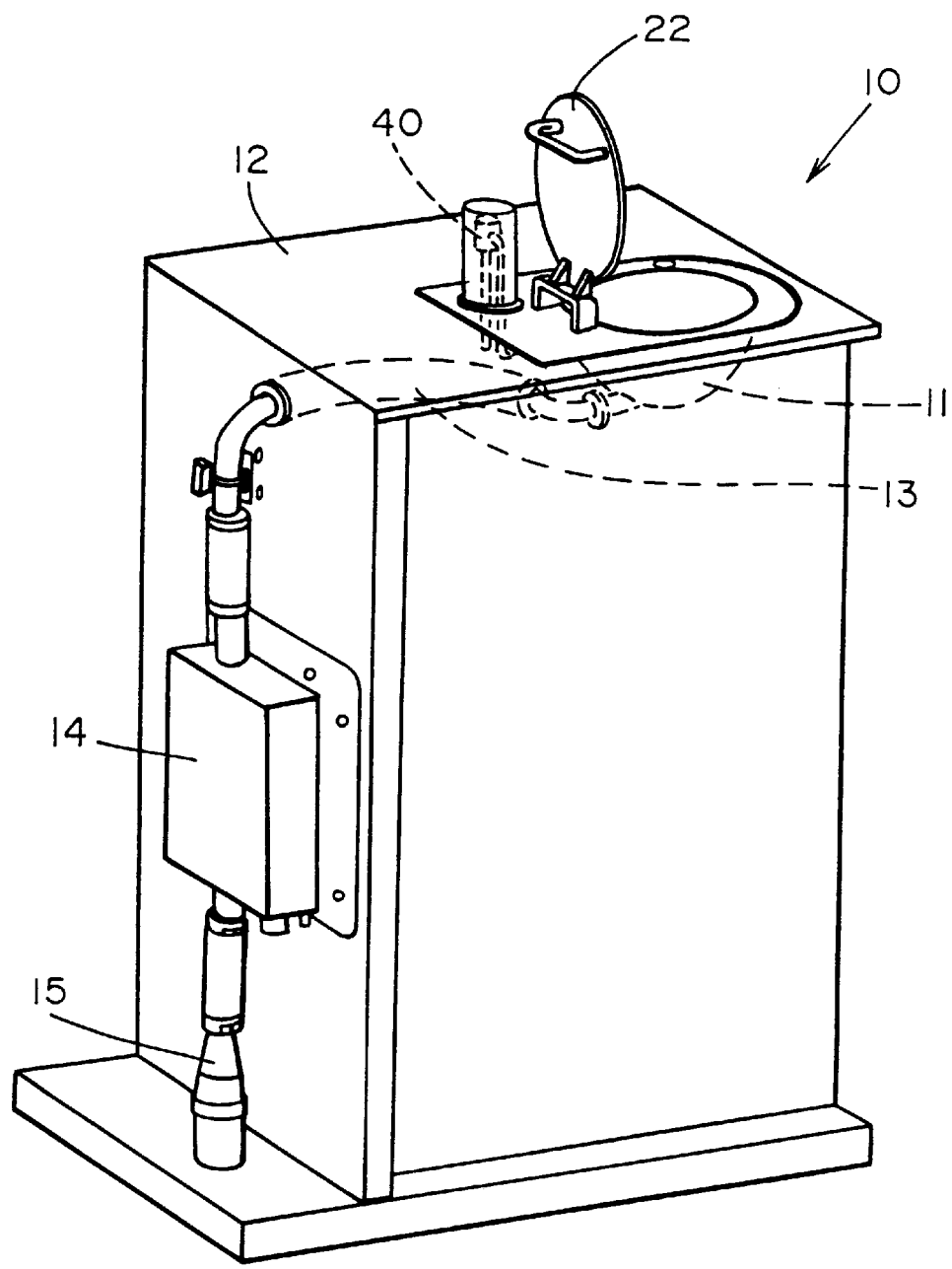
FIG. 1 is a partially schematic perspective view of a galley waste disposal system in accordance with the present invention.

Referring now to FIG. 1, a galley waste disposal system in accordance with the present invention is generally indicated with reference numeral 10. The system 10 generally comprises a basin 11 supported by a counter 12 provided in a vehicle. The basin 11 is connected by a drain pipe 13 to an enclosure 14 mounted remotely from the basin 11. The enclosure 14 is further connected to a vacuum sewer line 15 leading to a collection tank 16 (FIG. 2) of a conventional vacuum collection system. The vacuum collection system may be provided on a vehicle such as an aircraft, and includes a vacuum source such as a blower 17 connected to the collection tank 16. The vacuum collection system may further comprise apparatus for switching from the vacuum source to external atmospheric pressure, as described in greater detailed in commonly assigned U.S. Pat. No. 6,006,373, incorporated herein by reference.

Figure 2:
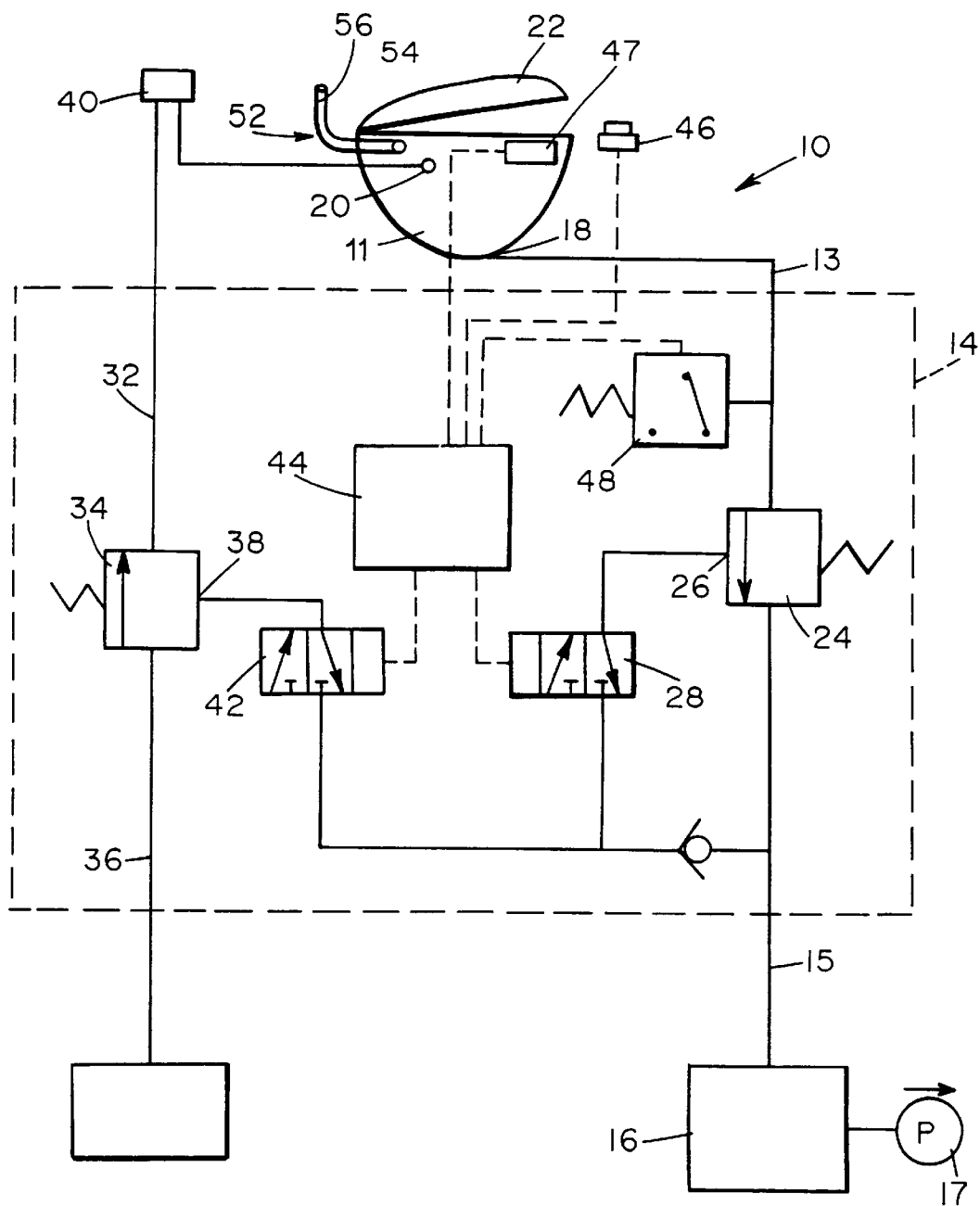
FIG. 2 is a partial schematic side view of the galley waste disposal system.

The basin 11 is preferably located in a food service area of the vehicle and provides a receptacle for waste material. The basin 11 includes an outlet 18 connected to the drain pipe 13, the drain pipe 13 preferably including at least one section of flexible pipe material between the basin 11 and the enclosure 14. At least one nozzle 20 is attached to the basin 11 for directing rinse water over an inside surface of the basin 11 (FIG. 2). The basin 11 further includes a lid 22 for covering a top of the basin 11.

A vacuum-operated discharge valve 24 is provided inside the enclosure 14 for selectively transporting waste from the basin 11 to the tank 16. As shown in FIG. 2, the discharge valve 24 is connected between the drain pipe 13 and sewer line 15, and includes an actuating port 26. In the illustrated embodiment, the discharge valve 24 is a normally-closed, vacuum operated valve. Accordingly, when a vacuum pressure is provided to the actuating port 26, the discharge valve 24 actuates to the open position, thereby establishing fluid communication between the sewer line 15 and drain pipe 13.

A first vacuum control valve 28 is also located inside the enclosure 14 for controlling operation of the discharge valve 24. As shown in FIG. 2, the first vacuum control valve 28 is preferably a solenoid valve having an inlet in fluid communication with the vacuum sewer line 15 and an outlet connected to the actuating port 26. The first vacuum control valve 28 is operable between at least a vent position, in which atmospheric pressures passes through the control valve 28 to the actuating port 26, and a closed position, in which vacuum pressure from the sewer line 15 passes through the control valve 28 into the actuating port 26. The control valve 28, therefore, controls operation of the discharge valve 24 by placing the actuating port 26 into and out of fluid communication with the sewer line 15.

The galley waste disposal system 10 preferably further includes apparatus for supplying rinse water to the basin 11. As shown in FIG. 1, the nozzle 20 is attached to the basin 14 and is connected to a rinse water pipe 32. A rinse water valve 34 is disposed in the rinse water pipe 32 between the nozzle 20 and a rinse water supply 36. As used herein, the phrase "rinse water" is intended to include water, water mixed with chemical reagent, or any other type of fluid used to rinse the surface of a basin or bowl.

The rinse water valve 34 is also vacuumed-operated, and has an actuating port 38 for conveying a pressure level to the valve actuator. A vacuum breaker 40 is provided between the rinse water valve 34 and the nozzle 20. In operation, the rinse water valve 34 moves between open and closed positions according to the pressure level present at the actuating port 38. For example, when atmospheric pressure is present at the actuating port 38, the rinse water valve 34 remains in a closed position However, when a partial vacuum is present at the actuating port 38, the rinse water valve 34 operates to an open position, thereby allowing rinse fluid to pass therethrough to the nozzle 20.

A second vacuum control valve 42 is provided for controlling pressure level at the rinse water valve actuating port 38. The second vacuum control valve 42 has an inlet in fluid communication with the vacuum sewer line 15 and an outlet in fluid communication with the rinse water valve actuating port 38. The second vacuum control valve 42 is preferably a solenoid valve operable between at least a vent position and a vacuum position. In the vent position, the actuating port 38 is opened to atmosphere so that the rinse water valve 34 remains closed. In the vacuum position, partial vacuum from the sewer line 15 communicates through the second control valve 42 to the actuating port 38 thereby to drive the rinse water valve 34 to the open position.

Figure 4:
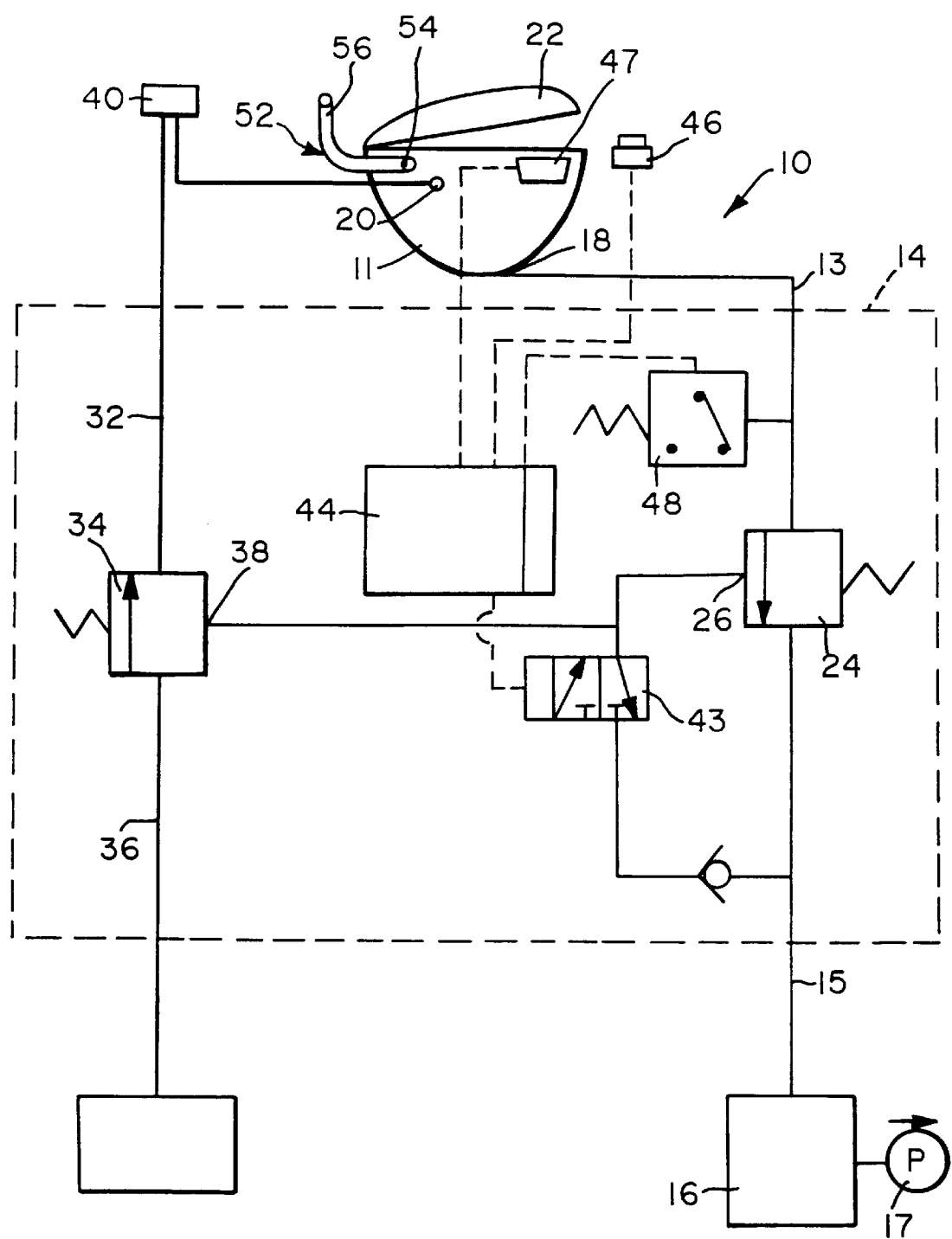
FIG. 4 is a partial schematic side view of an alternative embodiment of the galley waste disposal system.

While the illustrated embodiment illustrates separate first and second control valves 28, 42 dedicated to the discharge valve 24 and rinse water valve 34, it will be appreciated that a single vacuum control valve 43 may be connected to both the discharge and rinse water valves 24, 34 in accordance with the present invention, as shown in FIG. 4.

While the illustrated embodiment illustrates separate first and second control valves 28, 42 dedicated to the discharge valve 24 and rinse water valve 34, it will be appreciated that a single vacuum control valve may be connected to both the discharge and rinse water valves 24, 34 in accordance with the present invention.

A control board 44 is provided for actuating the first and second vacuum control valves 28, 42. As illustrated in FIG. 2, a flush element, such as flush button 46, is provided near the basin 11, and is capable of providing a discharge signal when actuated. The control board 44 is operably coupled to the flush button 46 to receive the discharge command. In response, the control board 44 operates the first vacuum control valve 28 to the vacuum position, thereby to open the discharge valve 24. The control board 44 also actuates the second control valve 42 to the vacuum position to open the rinse water valve 34. After a desired time period, the control board 44 actuates the first and second control valves 28, 42 back to the vent positions, thereby to close the discharge valve 24 and rinse water valve 34. The control board 44 operates the first and second vacuum control valves 28, 42 independently, so that the sequence and period of operation for each valve may be adjusted as needed. If a single control valve is connected to both the discharge and rinse water valves 24, 34, the control board 44 operates the single control valve to simultaneously open and close both valves 24, 34.

From the above, it will be appreciated that the discharge and rinse water valve assemblies are relatively compact and have minimal power requirements. The discharge and rinse water valves 24, 34 are vacuum operated and therefore do not themselves require electricity to operate. The first and second control valves 28, 42 connected to the discharge and rinse water valves 25, 34, however, are electrically operated, but are used only to control vacuum pressure to the actuating ports 26, 38 of the valves 24, 34. The preferred solenoid valves are rated at approximately 5.2 watts and therefore require less than approximately 0.2 amps, which is significantly less than the 2.5 amps required in conventional apparatus. Because the first and second control valves 28, 42 are electrically operated, vacuum control pressure will be delivered to the actuating ports 26, 38 regardless of the vacuum level of the system. In addition, the first and second control valves 28, 42 may be used to infer the positions of the discharge and rinse fluid water valves 24, 34, thereby providing feedback information.

Returning to the illustrated embodiment, a lid switch 47 is provided with the basin 11 for detecting whether the lid 22 is open or closed. The lid switch 47 is operably connected to the control board 44 and delivers a lid closed signal. The position of the lid 22 may be used to limit operation of the galley waste disposal system 10. For example, during normal operation when the lid 22 is closed, both the discharge valve 24 and rinse water valve 34 are opened during a discharge cycle. If the lid 22 is open, a risk exists that rinse water may splash out of the basin 14. Accordingly, the control board 44 may be programmed to allow normal operation only when the lid 22 is closed.

In accordance with the illustrated embodiment, the galley waste disposal system 10 further includes a pressure switch 48 for delivering an override discharge signal to the control board 44. As shown in FIG. 2, the pressure switch 48 is connected to the drain pipe 13, so that the pressure switch 48 is in fluid communication with the basin outlet 18. Accordingly, the pressure switch 48 monitors the pressure level in the drain pipe 13. It will be appreciated that, when the discharge valve 24 is closed, waste disposed in the basin 11 will pass through the outlet 18 and collect in the drain pipe 13. As additional waste accumulates, the pressure in the drain pipe 13 will increase. The pressure switch 48 has a pressure set point so that, when the pressure level in the drain pipe 13 reaches the pressure set point, the pressure switch 48 will trigger, thereby generating the override discharge signal. In response to the signal, the control board 44 will operate the first vacuum control valve 28, thereby transferring the waste from the drain pipe 13 to the vacuum sewer line 15. The control board 44 preferably does not actuate the second vacuum control valve 42 unless the lid 22 is closed to prevent rinse water from splashing out of the basin 14.

A vent 52 is provided for introducing make-up air during normal operation. As noted above, the lid 22 is typically closed during a normal discharge cycle. Cabin air must be allowed to enter the basin 11 to replace air pulled into the drain pipe 13. Accordingly, a vent hole 54 is formed in the basin 11 and is attached to a vent pipe 56. The vent pipe 56 extends upwardly above the basin 11 to provide an air entry point that is above the flood level of the basin 11.

Figure 3:
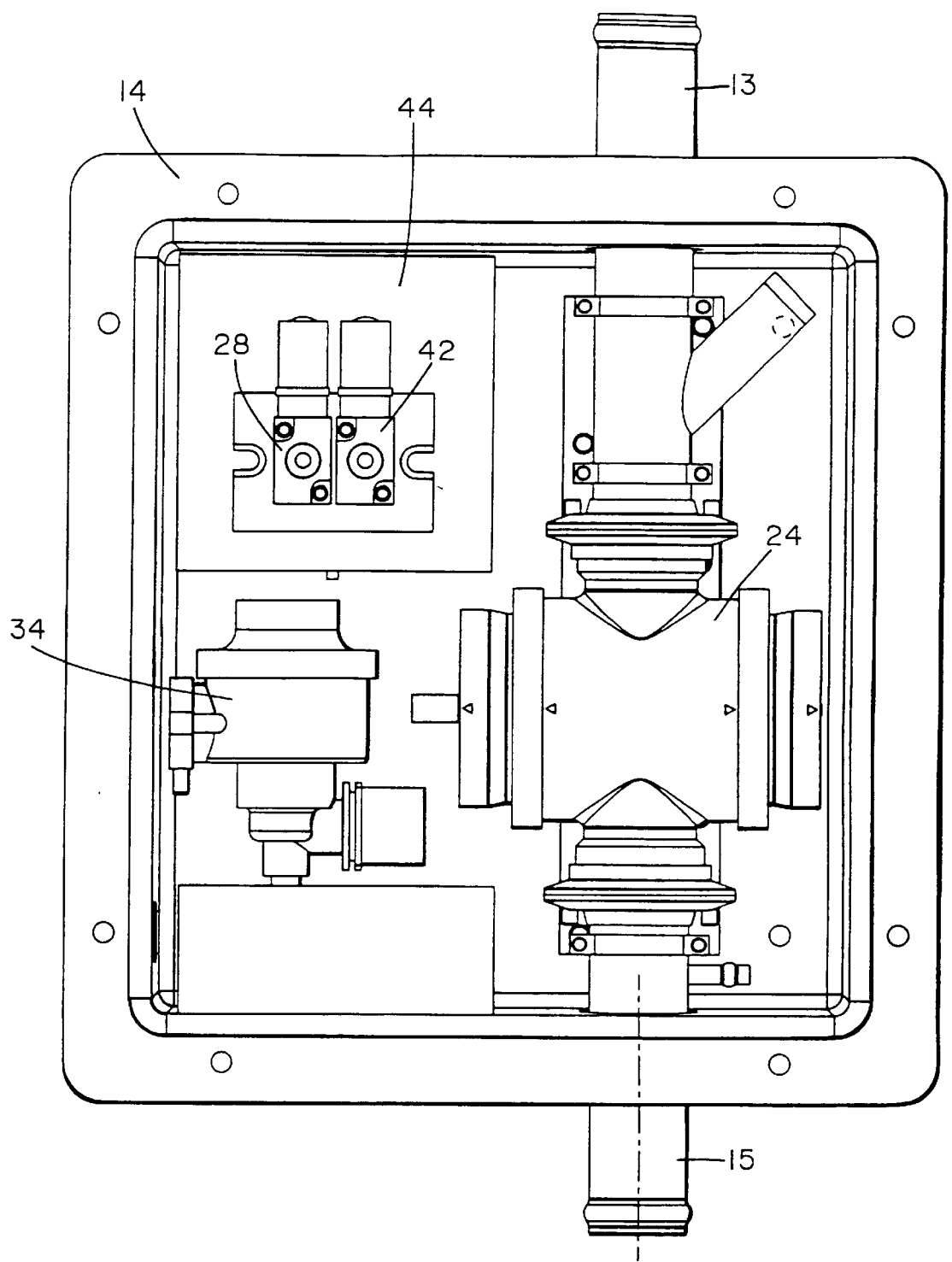
FIG. 3 is an enlarged side elevation view of an enclosure incorporated into the galley waste disposal system.

As best appreciated with reference to FIGS. 1 and 3, the valve and control components of the galley waste disposal system 10 are conveniently housed in the enclosure 14. The enclosure 14 is relatively compact and is suitable for mounting in a wide variety of locations, including remotely from the basin 11. As is best shown in FIG. 3, the discharge valve 24, first vacuum control valve 28, rinse water valve 34, second vacuum control valve 42, and control board 44 are all disposed within the enclosure 14. The use of a relatively small control board 44 and solenoid valves for the first and second vacuum control valves 28, 42 require much less space than in previous galley waste disposal systems. Because of the reduced space requirements, these components may be assembled inside the enclosure 60 which may be mounted remotely from the basin 14. The reduced volume and remote mounting capability allows the space under the basin 14 to be utilized, which is a particularly important consideration in aircraft applications.

The foregoing detailed description has been given for clearness of understanding only, and no unnecessary limitations should be understood therefrom, as modifications would be obvious to those skilled in the art.

What is claimed is:

1. Galley waste apparatus for use with an existing vacuum collection system having a tank and a vacuum source, the galley waste apparatus comprising:

a basin for receiving galley waste, the basin having an outlet;

a discharge valve connected between the basin outlet and the tank, the discharge valve having an actuating port responsive to vacuum for opening the discharge valve;

an electrically-operated vacuum control valve connected between the actuating port and the vacuum source;

a flush element actuatable to produce a discharge command;

a controller operably connected to the control valve and selectively operable in response to the discharge command to place the actuating port in fluid communication with the vacuum source, thereby to open the discharge valve; and a pressure switch in fluid communication with the basin outlet and operably connected to the controller, the pressure switch generating an override discharge command in response to a measured pressure level.

2. The apparatus of claim 1, in which the controller comprises a control board.

3. The apparatus of claim 1, in which the electrically-operated vacuum control valve comprises a solenoid valve.

4. The apparatus of claim 3, in which the solenoid valve provides feedback information to the controller.

5. The apparatus of claim 1, farther comprising a rinse valve connected between a rinse fluid source and the basin, the rinse valve having an actuating port responsive to vacuum for opening the rinse valve.

6. The apparatus of claim 5, in which the electrically-operated control valve is also connected between the rinse valve actuating port and the vacuum source.

7. The apparatus of claim 5, further comprising a second electrically-operated vacuum controlled valve connected between the rinse valve actuating port and the vacuum source.

8. A galley waste disposal system for use with an existing vacuum collection system having a tank and a vacuum source, the galley waste disposal system comprising:

a basin for receiving galley waste, the basin having an outlet;

a nozzle associated with the basin for dispensing rinse water;

a flush element actuateable to produce a discharge command; and an enclosure remotely positioned from the basin, the enclosure housing:
  a discharge valve connected between basin outlet and the tank,
  a rinse valve connected between the nozzle and a rinse water source; and
  a controller operably coupled to the discharge valve and rinse valve, the controller selectively operable in response to the discharge command to actuate the discharge valve and rinse valve.

9. The galley waste disposal system of claim 8, in which each of the discharge and rinse valves includes a vacuum responsive actuator.

10. The galley waste disposal system of claim 9, further comprising a first vacuum control valve connected between the vacuum source and the discharge valve actuator, the first vacuum control valve being housed in the enclosure.

11. The galley waste disposal system of claim 10, in which the first vacuum control valve is also connected between the vacuum source and the rinse valve actuator.

12. The galley waste disposal system of claim 10, further comprising a second vacuum control valve connected between the vacuum source and the rinse valve actuator, the second vacuum control valve being housed in the enclosure.

13. The galley waste disposal system of claim 12, in which the controller comprises a control board operably connected to the first and second vacuum control valves, the control board being housed in the enclosure.

14. A galley waste disposal system for use with an existing vacuum collection system having a tank and a vacuum source, the galley waste disposal system comprising:

a basin for receiving galley waste, the basin having an outlet and a lid movable between a closed position, in which the lid covers a top of the basin, and an open position, in which the lid is spaced from the top of the basin;

a nozzle associated with the basin for dispensing rinse water;

a lid detector for determining the position of the lid and generating a lid open signal and a lid closed signal;

a flush element actuatable to produce a discharge command;

a discharge valve connected between basin outlet and the tank, a rinse valve connected between the nozzle and a rinse water source; and a controller operably coupled to the discharge valve and rinse valve, the controller selectively operable in response to the discharge command to actuate the discharge valve and rinse valve, wherein the controller operates only the discharge valve when a lid open signal is received, and wherein the controller operates both the discharge and rinse valves when a lid closed signal is received.

15. The galley waste disposal system of claim 14, further comprising a pressure switch in fluid communication with the basin outlet, the pressure switch adapted to generate an override discharge signal to the controller.

16. The galley waste disposal system of claim 14, in which the controller comprises a control board.

17. The galley waste disposal system of claim 14, in which each of the discharge and rinse valves includes a vacuum responsive actuator.

18. The galley waste disposal system of claim 17, further comprising a first vacuum control valve connected between the vacuum source and the discharge valve actuator.

19. The galley waste disposal system of claim 18, in which the first vacuum control valve is also connected between the vacuum source and the rinse valve actuator.

20. The galley waste disposal system of claim 18, further comprising a second vacuum control valve connected between the vacuum source and the rinse valve actuator.

21. The galley waste disposal system of claim 20, in which the controller comprises a control board operably connected to the first and second vacuum control valves.

22. A galley waste disposal system for use with an existing vacuum collection system having a tank and a vacuum source, the galley waste disposal system comprising:

a basin for receiving galley waste, the basin having an outlet;

a nozzle associated with the basin for dispensing rinse water;

a flush element actuateable to produce a discharge command; and an enclosure remotely positioned from the basin, the enclosure housing:
  a discharge valve connected between basin outlet and the tank, and
  a rinse valve connected between the nozzle and a rinse water source.

23. The galley waste disposal system of claim 22, in which each of the discharge and rinse valves includes a vacuum responsive actuator.

24. The galley waste disposal system of claim 23, further comprising a first vacuum control valve connected between the vacuum source and the discharge valve actuator, the first vacuum control valve being housed in the enclosure.

25. The galley waste disposal system of claim 24, in which the first vacuum control valve is also connected between the vacuum source and the rinse valve actuator.

26. The galley waste disposal system of claim 24, further comprising a second vacuum control valve connected between the vacuum source and the rinse valve actuator, the second vacuum control valve being housed in the enclosure.

* * * * *

UNITED STATES PATENT AND TRADEMARK OFFICE
CERTIFICATE OF CORRECTION

PATENT NO. : 6,385,789 B1
DATED : May 14, 2002
INVENTOR(S) : Pondelick et al.

It is certified that error appears in the above-identified patent and that said Letters Patent is hereby corrected as shown below:

<u>Title page, Item [54] and Column 1, line 1,</u>
Please delete "GALLERY" and replace with -- GALLEY --.

<u>Column 6,</u>
Line 54, please delete "farther" and replace with -- further --.

Signed and Sealed this

Thirtieth Day of July, 2002

*Attest:*

*Attesting Officer*

JAMES E. ROGAN
*Director of the United States Patent and Trademark Office*